United States Patent
Bajaria et al.

(10) Patent No.: US 11,283,761 B2
(45) Date of Patent: *Mar. 22, 2022

(54) METHODS, SYSTEMS AND MEDIA FOR DE-ANONYMIZING ANONYMOUS ONLINE ACTIVITIES

(71) Applicant: 6Sense Insights, Inc., San Francisco, CA (US)

(72) Inventors: Viral Bajaria, San Francisco, CA (US); Premal Shah, Union City, CA (US); Nitin Vijayvargiya, San Francisco, CA (US); Dustin Chang, San Jose, CA (US)

(73) Assignee: 6Sense Insights, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,624

(22) Filed: Dec. 18, 2020

(65) Prior Publication Data

US 2021/0105249 A1    Apr. 8, 2021

Related U.S. Application Data

(63) Continuation of application No. 16/736,545, filed on Jan. 7, 2020, now Pat. No. 10,873,560, which is a
(Continued)

(51) Int. Cl.
*H04L 29/12* (2006.01)
*G06F 17/18* (2006.01)
(Continued)

(52) U.S. Cl.
CPC .......... *H04L 61/1552* (2013.01); *G06F 9/542* (2013.01); *G06F 17/18* (2013.01);
(Continued)

(58) Field of Classification Search
CPC ... H04L 61/1552; H04L 61/609; H04L 67/22; H04L 67/306; G06F 9/542; G06F 17/18
See application file for complete search history.

(56) References Cited

U.S. PATENT DOCUMENTS 6,745,150 B1    6/2004  Breiman
6,839,680 B1 *  1/2005  Liu ..................... G06Q 30/0204
                                                    705/7.33
(Continued)

FOREIGN PATENT DOCUMENTS

WO    2009017942 A1    2/2009

OTHER PUBLICATIONS

International Search Report and Written Opinion issued in International Application No. PCT/US2018/65155, dated Mar. 25, 2019 in 12 pages.
(Continued)

*Primary Examiner* — Umar Cheema
*Assistant Examiner* — Patrick F Ngankam
(74) *Attorney, Agent, or Firm* — Procopio, Cory, Hargreaves & Savitch

(57) ABSTRACT

Mapping anonymous Internet entities to known accounts. In an embodiment, events, representing online activity and comprising IP addresses, are received from a plurality of sources. Subsets of the events are aggregated into mappings that associate the IP address, shared by the subset, with an account. Each mapping is associated with statistics regarding the events. A confidence value is calculated for each mapping based on the statistics, and a final subset of the mappings is selected based on the confidence values. Subsequently, when a request with an IP address is received, the final subset of mappings is searched for the requested IP address, and an indication of the account associated with the requested IP address is returned in response to the request.

20 Claims, 6 Drawing Sheets

Related U.S. Application Data continuation of application No. 16/218,317, filed on Dec. 12, 2018, now Pat. No. 10,536,427.

(60) Provisional application No. 62/609,753, filed on Dec. 22, 2017.

(51) Int. Cl.
| | |
|---|---|
| *H04L 29/08* | (2006.01) |
| *G06F 9/54* | (2006.01) |
| *H04L 61/4552* | (2022.01) |
| *H04L 101/69* | (2022.01) |
| *H04L 67/306* | (2022.01) |
| *H04L 67/50* | (2022.01) |

(52) U.S. Cl.
CPC ............ *H04L 61/609* (2013.01); *H04L 67/22* (2013.01); *H04L 67/306* (2013.01)

(56) References Cited

U.S. PATENT DOCUMENTS

| | | |
|---|---|---|
| 7,809,781 B1 | 10/2010 | Shan |
| 7,818,206 B2 | 10/2010 | Smith et al. |
| 8,108,245 B1 | 1/2012 | Hosea et al. |
| 8,521,594 B1 | 8/2013 | Skoe et al. |
| 8,819,222 B2 | 8/2014 | Maffione et al. |
| 9,003,025 B2 | 4/2015 | Christodorescu et al. |
| 9,135,653 B2 | 9/2015 | Vaynblat et al. |
| 9,824,199 B2 | 11/2017 | Kshirsagar et al. |
| 2003/0083938 A1 | 5/2003 | Smith et al. |
| 2005/0166065 A1 | 7/2005 | Eytchison et al. |
| 2005/0192863 A1 | 9/2005 | Mohan |
| 2008/0040224 A1 | 2/2008 | Roker |
| 2009/0028183 A1 | 1/2009 | Landers et al. |
| 2009/0037602 A1 | 2/2009 | Patel et al. |
| 2011/0131316 A1 | 6/2011 | Ferris et al. |
| 2011/0184905 A1 | 7/2011 | Phillips |
| 2011/0321175 A1 | 12/2011 | Slater |
| 2012/0072546 A1 | 3/2012 | Etchegoyen |
| 2012/0159564 A1 | 6/2012 | Spektor et al. |
| 2013/0054433 A1 | 2/2013 | Giard et al. |
| 2013/0055367 A1 | 2/2013 | Kshirsagar et al. |
| 2013/0159413 A1 | 6/2013 | Davis et al. |
| 2013/0167207 A1 | 6/2013 | Davis et al. |
| 2014/0012973 A1 | 1/2014 | Christodorescu et al. |
| 2014/0012976 A1* | 1/2014 | Christodorescu ..... H04L 67/306 709/224 |
| 2014/0280877 A1 | 9/2014 | Koulomzin |
| 2015/0333973 A1 | 11/2015 | Boccardi et al. |
| 2015/0341453 A1 | 11/2015 | Miller et al. |
| 2016/0142272 A1* | 5/2016 | Stringham .............. H04L 43/04 709/224 |
| 2016/0239868 A1 | 8/2016 | Demsey et al. |
| 2016/0360355 A1 | 12/2016 | Vudali et al. |
| 2017/0243028 A1 | 8/2017 | LaFever et al. |
| 2017/0364931 A1 | 12/2017 | Khavronin et al. |
| 2018/0188932 A1 | 7/2018 | So et al. |
| 2018/0365710 A1 | 12/2018 | Halecky et al. |

OTHER PUBLICATIONS

Extended European Search Report for corresponding application No. 18890683.8, dated Dec. 14, 2020, in 3 pages.

\* cited by examiner

METHODS, SYSTEMS AND MEDIA FOR DE-ANONYMIZING ANONYMOUS ONLINE ACTIVITIES

CROSS-REFERENCE TO RELATED APPLICATIONS

This application is a continuation of U.S. patent application Ser. No. 16/736,545, filed on Jan. 7, 2020, which is a continuation of U.S. patent application Ser. No. 16/218,317, filed on Dec. 12, 2018, which claims priority to U.S. Provisional Patent App. No. 62/609,753, filed on Dec. 22, 2017, which are all hereby incorporated herein by reference as if set forth in full.

BACKGROUND

Field of the Invention

The embodiments described herein are generally directed to mapping anonymous Internet entities (e.g., IP addresses, domains, cookies, and/or devices) to known accounts (e.g., company names), to thereby de-anonymize an online visitor or contact.

Description of the Related Art

One significant and well-known problem that arises in the context of Internet communications is the ability for Internet users to remain virtually anonymous. While this anonymity is arguably good for free speech, it is bad for business. For example, unless a visitor to a website chooses to accurately identify himself or herself, an operator of the website may know little to nothing about the identity of that visitor.

In most cases, all the operator of the website will know about the visitor is an Internet Protocol (IP) address used by the visitor's browsing device, a domain of the visitor (e.g., a domain with which the IP address is associated), and/or, if available, one or more "cookies" (data stored on the user's device by a website during a visit to that website). This is generally not enough information to initiate contact with the visitor, for example, to market a product or service to the visitor.

In contrast, in a brick-and-mortar store, a merchant may physically approach visitors to immediately initiate contact with that visitor, for example, to begin marketing a product or service. Thus, the Internet, while convenient for marketing and commerce, presents a problem for merchants whose visitors remain anonymous. This is a problem that simply does not exist in the brick-and-mortar context.

Accordingly, a solution is needed for piercing the unique shroud of anonymity afforded to visitors by the Internet. Preferably, such a solution would enable merchants to determine contact information for otherwise anonymous Internet visitors. Such a solution could be especially advantageous for predictive marketing methods, such as those described in U.S. Patent Pub. No. 2013/0204663, filed on Feb. 7, 2013, which is hereby incorporated herein by reference.

SUMMARY

In an embodiment, a method for de-anonymizing anonymous Internet Protocol (IP) addresses is disclosed. The method comprises using at least one hardware processor of a server platform to: receive a plurality of events from a plurality of sources, wherein each of the plurality of events represents an online activity and comprises an IP address and event information; aggregate subsets of the plurality of events into a plurality of mappings, wherein each of the plurality of mappings associates the IP address, shared by a subset of the plurality of events, with an account, and is associated with a plurality of statistics regarding the subset of events; for each of the plurality of mappings, compute a confidence value for the mapping based on the associated plurality of statistics; select a final subset of the plurality of mappings based on the confidence values for the plurality of mappings; and respond to one or more requests, comprising a requested IP address, by searching the final subset of mappings for the requested IP address, and returning an indication of an account associated with the requested IP address in the final subset of mappings. The method may further comprise using the at least one hardware processor to normalize the event information across the plurality of events. The event information for each of the plurality of events may comprise a domain name. For each of the plurality of events, the event information may comprise a geographical region associated with the IP address of the event. Each account may comprise a company name.

In an embodiment, selecting a final subset of the plurality of mappings based on the confidence values for the plurality of mappings comprises, for at least one set of two or more mappings which each associate a same IP address with different accounts: determining one of the two or more mappings with a maximum confidence value among the two or more mappings; computing a sum of the confidence values for the two or more mappings; computing a ratio of the maximum confidence value to the sum of the confidence values; and, when the ratio does not exceed a threshold, excluding the two or more mappings from the final subset of mappings. The threshold may comprise a constant value multiplied by the difference between one and the maximum confidence value.

In an embodiment, computing a confidence value for each mapping based on the associated plurality of statistics comprises: calculating a time confidence value, indicating a timing of events from which the mapping was derived; calculating a statistical confidence value, indicating a frequency of the events from which the mapping was derived; calculating a source confidence value, indicating an accuracy of one or more of the plurality of sources from which the events, from which the mapping was derived, were received; and calculating the confidence value based on the time confidence value, the statistical confidence value, and the source confidence value. The plurality of statistics may comprise a span and a delay, wherein the span indicates a time period over which the events, from which the mapping was derived, occurred, wherein the delay indicates a time period since a most recent event, from which the mapping was derived, occurred, and wherein the time confidence value is calculated as:

$$\frac{\log_3(\text{span}) - \log_3(\text{delay})}{1 + |\log_3(\text{span}) - \log_3(\text{delay})|}$$

The plurality of statistics may comprise a spread and a strength, wherein the spread indicates a number of time periods in which the events, from which the mapping was derived, occurred, wherein the strength indicates a number of events from which the mapping was derived, and wherein the statistical confidence value is calculated as:

$$\text{weight}_{strength} * \log_{1000}(\text{strength}) + \text{weight}_{spread} * \log_{1000}(\text{spread}),$$

wherein $\text{weight}_{strength}$ and $\text{weight}_{spread}$ are constant values that sum to one. For example, $\text{weight}_{strength}$ and $\text{weight}_{spread}$ may both equal 0.5.

In an embodiment, the source confidence value is calculated as:

$$1 - {}_i{}^s\Pi(1 - \text{source\_confidence}_s),$$

wherein each $\text{source\_confidence}_s$ represents a source confidence value for one of the one or more sources from which the events, from which the mapping was derived, were received. The method may further comprise using the at least one hardware processor to, for each of the plurality of sources, calculate the source confidence value for the source by: identifying a truth set of mappings which were each derived from events from at least N of the plurality of sources, wherein N is greater than or equal to two; identifying an overlap between a source set of mappings, which were derived from events received from the source, and the truth set of mappings; and calculate the source confidence value for the source based on the identified overlap between the source set of mappings and the truth set of mappings.

In an embodiment, the confidence value is calculated as:

$$\text{weight}_1(\text{conf}_{source} + (1 - \text{conf}_{source})\text{conf}_{stat}) + \text{weight}_2(\text{conf}_{time}),$$

wherein $\text{conf}_{source}$ is the source confidence value, $\text{conf}_{stat}$ is the statistical confidence value, $\text{conf}_{time}$ is the time confidence value, and wherein $\text{weight}_1$ and $\text{weight}_2$ are constant values that sum to one. For example, $\text{weight}_1$ equals 0.7, and $\text{weight}_2$ equals 0.3.

In an embodiment, the method further comprises using the at least one hardware processor to, after a new set of events is received from one or more sources: aggregate subsets of the new set of events into a new set of mappings; extract a portion of the final subset of mappings that include IP addresses in the new set of events; merge the new set of mappings with the extracted portion of the final subset of mappings by, for each mapping in the merged set of mappings, recomputing the plurality of statistics and the confidence value for the mapping; and update the final subset of mappings with the merged set of mappings. Each of the plurality of events may be stored in a persistent event pool, and the new set of events may not be stored in the persistent event pool until after the final subset of mappings has been updated.

In an embodiment, the method further comprises using the at least one hardware processor to: generate a graphical user interface comprising one or more inputs for receiving a user request comprising a requested IP address; in response to receiving the user request, adding an inquiry, representing the request, to a queue of inquiries; subsequently, when the inquiry reaches the front of the queue, querying the final subset of the plurality of mappings based on the inquiry; and, after receiving a result of the query, generating a graphical user interface comprising a visual representation of the result of the query.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for mapping anonymous entities (e.g., IP address, domain, cookie, and/or device) to known accounts (e.g., companies). After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
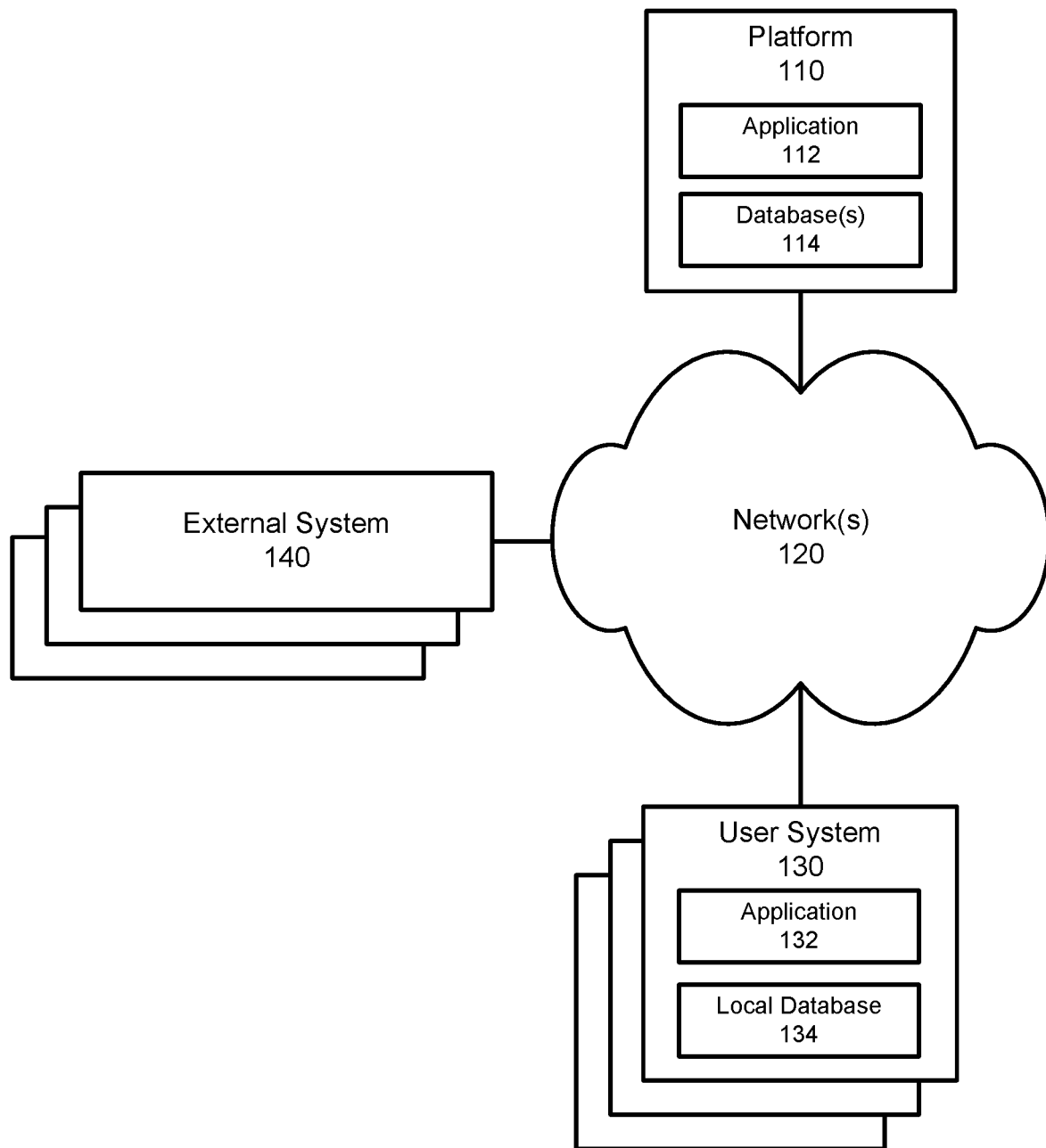
FIG. 1 illustrates an example infrastructure, in which one or more of the processes described herein, may be implemented, according to an embodiment.

FIG. 1 illustrates an example infrastructure in which a system that maps anonymous entities (e.g., IP address, domain, cookie, and/or device) to known accounts (e.g., companies) may operate, according to an embodiment. The infrastructure may comprise a platform 110 (e.g., one or more server devices) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., data sources, websites, web services, other platforms, etc.) via one or more networks 120.

Network(s) 120 may comprise the Internet, and platform 110 may communicate with user system(s) 130 and external system(s) 140 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and the like.

Platform 110 may comprise web servers which host one or more websites and/or web services. In embodiments in which a website is provided, the website may comprise one or more user interfaces, including, for example, webpages generated in HyperText Markup Language (HTML) or other language. Platform 110 transmits or serves these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to platform 110 and the responses from platform 110, including the user interfaces, may both be communicated through network(s) 120, which may include the Internet, using standard communication protocols (e.g., HTTP, HTTPS, etc.). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Sybase™, Access™, and the like, including cloud-based database instances and proprietary databases. Data may be sent to platform 110, for instance, using the well-known POST request supported by HTTP, via FTP, etc. This data, as well as other requests, may be handled, for example, by server-side web technology, such as a servlet or other software module (e.g., server application 112), executed by platform 110.

In embodiments in which a web service is provided, platform 110 may receive requests from external system(s) 140, and provide responses in Javascript Object Notation (JSON), eXtensible Markup Language (XML), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system (s) 130 may interact with server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while server application on platform 110 is responsible for generating the webpages and managing database functions. Alternatively, client application 132 may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case application 112 performs all processing) or user system(s) 130 (e.g., in which case application 132 performs all processing) or be distributed between platform 110 and user system(s) 130 (e.g., in which case server application 112 and client application 132 both perform processing), can comprise one or more executable software modules that implement one or more of the processes, methods, or functions of the application(s) described herein.

1.2. Example Processing Device

Figure 2:
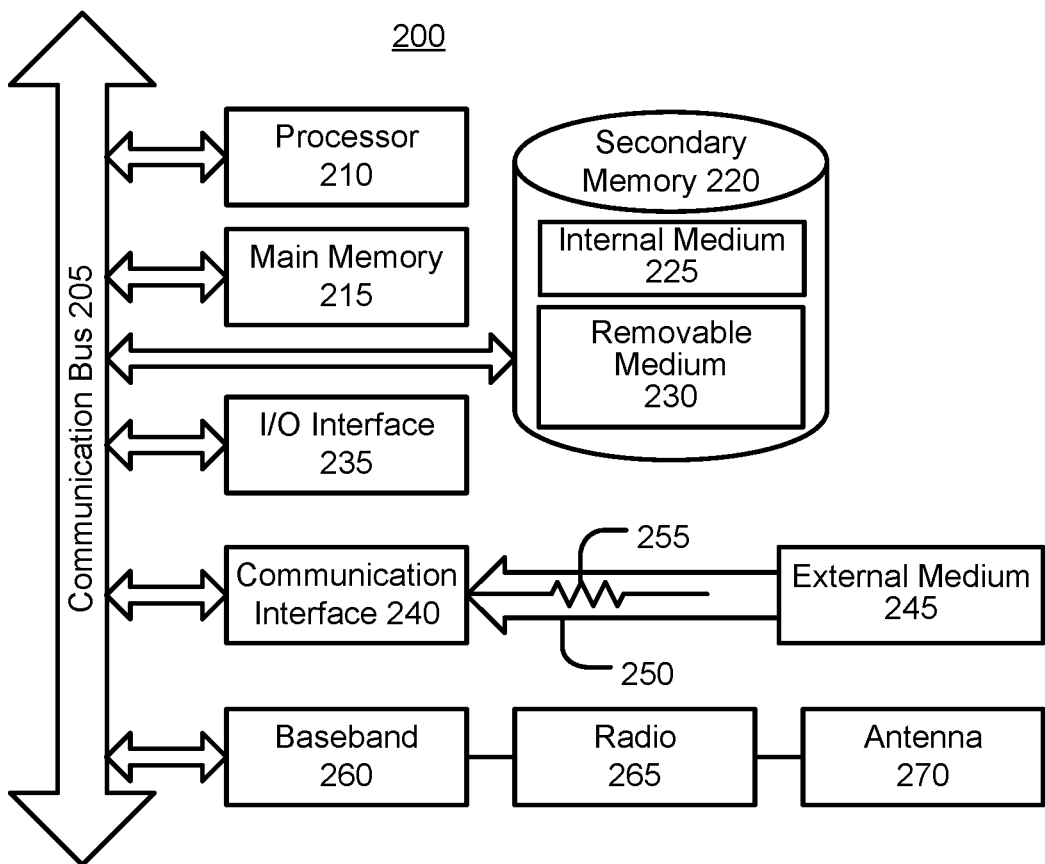
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the mechanisms, processes, methods, or functions (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules of the application discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and the like.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, and the like. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components may comprise an antenna system 270, a radio system 265, and a baseband system 260. In system 200, RF signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low-noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

1.3. Example Data Structures

The term "entity" may be used herein to refer to data that is associated with a visitor or contact throughout an activity. For example, an entity may include, without limitation, an IP address used by a visitor's or contact's device (e.g., a user system 130) for online communications, a domain name (e.g., for a website and/or email domain) associated with a visitor or contact during online communications, and/or a cookie that has been stored on a visitor's device during browsing. Such data may be permanently, semi-permanently, or temporarily associated with the visitor or contact, and typically will not uniquely identify the visitor or contact. For example, an IP address may be a static IP address that is always associated with a particular visitor's device, or a dynamic IP address that may be temporarily assigned to one device and then subsequently reassigned by an Internet service provider (ISP) to a different device. In addition, a particular visitor may utilize multiple IP addresses (e.g., one IP address while the visitor is at work and another IP address while the visitor is at home). Similarly, one domain name may be associated with multiple visitors or contacts, and one visitor or contact may be associated with multiple domain names. As another example, a visitor may be associated with multiple cookies at once and over time, and each cookie may exist for only a limited time on a visitor's device before being deleted (e.g., manually by a user of the device, automatically after an expiration period or upon termination of a session, etc.).

The term "event" may be used herein to refer to any activity from any source. Activities may include, without limitation, accessing a webpage of a website, filling out an online form, purchasing a product via an ecommerce site, contacting a merchant or salesperson (e.g., via an online form, electronic mail (email) message, instant-messaging chat, Short Message Service (SMS) text, Multimedia Messaging Service (MMS) message, etc.), and/or any other online interaction. Activities could also include offline activities, such as attending a trade show or seminar, calling a customer-service call center, making an offline purchase, and/or the like. Sources may include, without limitation, a website, a marketing automation platform (MAP), a cookie-tracking source, vendor data, and/or the like. As an example, a visitor to a website may fill out an online form within a webpage of the website, and this activity may be communicated to the application, along with an entity representing the visitor (e.g., the IP address used by the visitor's device to communicate with the website, a domain name associated with the visitor's ISP or enterprise, a string representing the partial or entire contents of a tracking cookie stored on the visitor's device, etc.), as an event.

An event may be implemented as a data structure (e.g., vector, linked list, array, delimited string, etc.) which comprises a representation of the entity (e.g., IP address, domain, and/or cookie) that represents the visitor and a timestamp representing the time at which the activity occurred. It should be understood that this data structure could also comprise any additional data, which may aid in mapping the visitor to an account, identifying or categorizing the activity, and/or the like. For example, each event data structure could also comprise a representation of the activity, source information indicating the source of the event and/or activity, and/or the like. In addition, the event may comprise visitor-specific information, if, for example, the visitor submitted a form or logged into his or her account during a visit. In such a case, the source can incorporate user-specific information, entered in the form or acquired from a user profile associated with the logged-in account, in the event information recorded for the event.

The term "mapping" may be used herein to refer to each association between an entity and an account (e.g., company name or other company identifier). Each mapping indicates that there is at least some reason to believe that the entity has been used by the associated account in the past, and therefore, that current or future activity by that entity may represent online activity by that account. A mapping may be implemented as a data structure which comprises a representation of the entity (e.g., IP address, domain, and/or cookie) and an account identifier. It should be understood that this data structure could also comprise any additional data, including a span, delay, spread, strength, source weight, overlap, and/or confidence.

In an embodiment, each mapping data structure comprises or is associated with a span value. The span value represents a time period over which the respective mapping was active. For example, if the mapping was derived from three events that occurred on Jan. 1, 2017, Mar. 3, 2017, and Nov. 4, 2017, the span value may be calculated as the number of days between the first and last events (i.e., Jan. 1, 2017 through Nov. 4, 2017, or three-hundred-seven days). It should be understood that the span value may be calculated and represented according to any level of granularity (e.g., number of days, hours, minutes, seconds, milliseconds, etc.), but, for simplicity, will be measured in days in the present disclosure.

In an embodiment, each mapping data structure comprises or is associated with a delay value. The delay value represents a time period since the respective mapping was last active. For example, if on Jan. 1, 2018, no event has occurred for a mapping since Nov. 4, 2017, the delay value may be calculated as the number of days between Nov. 4, 2017 and Jan. 1, 2018 (i.e., fifty-eight days). It should be understood that the delay value may be calculated and represented according to any level of granularity (e.g., number of days, hours, minutes, seconds, milliseconds, etc.), but, for simplicity, will be measured in days in the present disclosure.

In an embodiment, each mapping data structure comprises or is associated with a spread value. The spread value represents a time period that indicates the frequency with which the mapping was active over its span value. For example, if the mapping was derived from three or more events that occurred on Jan. 1, 2017, Mar. 3, 2017, and Nov. 4, 2017, the spread value may be three days. It should be understood that the spread value may be calculated and represented according to any level of granularity (e.g., number of days over which the events occurred, or total duration of the events in days, hours, minutes, seconds, milliseconds, etc.), but, for simplicity, will be measured in days in the present disclosure.

In an embodiment, each mapping data structure comprises or is associated with a strength value. The strength value represents the frequency with which the mapping was active over its span value. For example, if the mapping was derived from one event that occurred on Jan. 1, 2017, two events that occurred on Mar. 3, 2017, and three events that occurred on Nov. 4, 2017, the strength value may be six, since there were six events. Notably, the strength value is different than the spread value since it indicates the number of events, rather than the number of days (e.g., multiple events may occur in one day) or other amount of time. It should be understood that, in the event that the spread value is a number of days, the strength value may equal or exceed the spread value, but should never be less than the spread value.

In an embodiment, each mapping data structure comprises or is associated with a source weight. The source weight represents a relative accuracy of the source or source(s) of the events, from which the respective mapping was derived. The calculation of the source weight is described elsewhere herein.

In an embodiment, each mapping data structure comprises or is associated with an overlap value. The overlap value represents the number of sources that corroborate the respective mapping. For example, if the mapping was derived from events that were received from three different sources or the mapping corresponds to other mappings derived from two other different sources, the overlap value would be three total sources (or two corroborating sources).

In an embodiment, each mapping data structure comprises or is associated with a confidence value which has been computed based on one or more factors (e.g., the span, delay, spread, strength, source weight, and/or overlap statistics), as described elsewhere herein. In this context, the confidence value for a particular mapping represents a measure of confidence that a visitor or contact, who has used, is using, or will use the respective entity, is associated with the respective account. The confidence value will primarily be described herein as a decimal value between zero and one. However, it should be understood that the range of possible confidence values can be easily converted to any desired range of values, with corresponding modifications to any disclosed calculations which rely upon the confidence value.

The term "event pool" is used herein to refer to a data structure in which all of the raw event data structures are stored. For example, whenever an event is received from a source, a representation of the event may be stored in the event pool as the described event data structure. Each event data structure may comprise, for example, a timestamp (e.g., indicating the date and/or time on which the activity, underlying the event, occurred), the entity (e.g., IP address, website and/or email domain, and/or cookie), the source from which the event was received and/or at which the event occurred, a hash of an email address associated with the event (if any), a company name (if any), a geographical location (based on a user entry during the underlying activity or a user profile if the user was logged in to an account for the activity), and/or the geographical-IP location if the entity includes an IP address (i.e., each IP address can be associated with a country, since different IP blocks are allocated to different countries). Each event data structure could also comprise additional information (e.g., relevant information from a user entry or user profile), such as city, state, Zip code, Global Positioning System (GPS) coordinates (e.g., latitude, longitude, and/or elevation), and/or the like. Prior to entry in the event pool, one or more fields of each event data structure may be normalized, as described elsewhere herein.

Since every single event is individually stored in the event pool and the number of events being collected will generally be extremely large, the event pool will be correspondingly large. Thus, in order to process the events in a more condensed state, the application may utilize a "mapping pool." Specifically, the term "mapping pool" is used herein to refer to a data structure which aggregates events, stored in the event pool, to form mappings.

2. Process Overview

Embodiments of processes for mapping anonymous entities to known accounts will now be described in detail. It should be understood that the described processes may be embodied in one or more software modules that are executed by one or more hardware processors, for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130 such that some portions or modules of the application are executed by platform 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Figure 3:
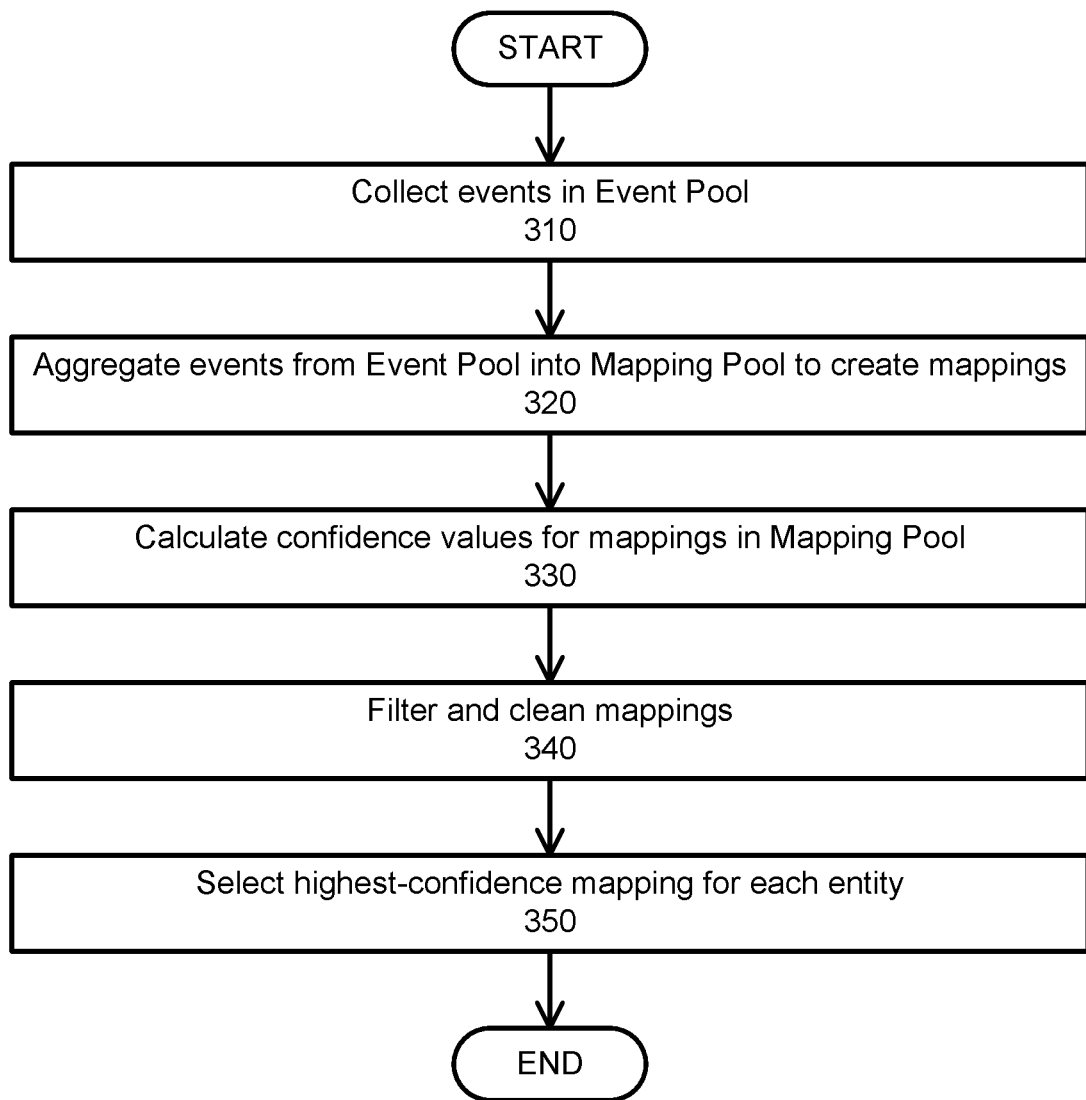
FIG. 3 illustrates a process for mapping anonymous entities to known accounts, according to an embodiment.

FIG. 3 illustrates a process 300 for mapping anonymous entities to known accounts, according to an embodiment. While process 300 is illustrated with a certain arrangement and ordering of steps, process 300 may be implemented with fewer, more, or different steps and a different arrangement and/or ordering of steps.

2.1. Collection into Event Pool

In step 310, the application receives events from one or more sources (e.g., external systems 140 and/or internal sources on platform 110) and collects them into an event pool. As described elsewhere herein, each event may be received as a data structure comprising at least an entity and a timestamp. Each event may be stored in a data structure within the event pool, and may comprise the entity (e.g., IP address, domain, and/or cookie), the timestamp, an identifier of the source of the event, and, optionally, additional information (e.g., a geographical-IP location associated with an IP address in the entity, a company or user name, etc.).

Notably, the raw event data may be noisy. Thus, in an embodiment, the event data is normalized as it is entered into the event pool or after it has been entered into the event pool. For example, normalization may be performed on the geographical-IP locations (e.g., converting all variations of the same country name into a single, canonical country name using nomenclature and/or grammar techniques), the company or account names (e.g., converting all variations of the same company or account name into a single, canonical name using nomenclature and/or grammar techniques), domain names (e.g., discarding any portion of the domain name preceding the second-level domain name), and/or other fields. Fuzzy matching may be used to identify variations of these field values. The normalization can be performed across fields in all of the entries in the event pool to maximize the subsequent aggregation process.

As an example of normalization, one or more aliases of a master domain (e.g., abc.com is an alias of abc.go.com) may be detected in incoming event data and normalized to the master domain prior to entry into the event pool. Advantageously, this avoids the same domain being analyzed as different domains. In an embodiment, an alias set can be constructed using one or more (including all) of the following techniques (e.g., implemented by the application):

(1) Send a request to a first domain (e.g., abc.com) to see if it redirects to a second domain (e.g., abc.go.com). If the request to the first domain redirects to the second domain, the first domain is an alias of the second domain (e.g., abc.com is an alias of abc.go.com).

(2) Retrieve the Domain Name System (DNS) IP address for a domain (e.g., using a DNS lookup), and construct a set of domains associated to the retrieved IP address (e.g., using a reverse IP lookup, such that DNS IP=>set of domains). Once the set of domains has been constructed, the application can send a request to each domain in the set of domains, and check the similarity between the returned webpages (e.g., based on style). For example, if the set of domains for the IP address 1.1.1.1 is [a.com, b.com, c.com], the webpages at a.com, b.com, and c.com can be retrieved, and the styles of those retrieved webpages can be compared. If the styles are identical or similar, the application can determine that the set of domains [a.com, b.com, c.com] is a set of aliases, and select one of the domains from the set of domains to act as the master domain. For instance, the application may randomly select a.com as the master domain, and normalize all future event data to the master domain by modifying any event data associated with alias domains b.com and c.com to be associated with the master domain a.com (any event data associated with a.com will remain associated with a.com).

(3) Construct a set of domains (e.g., seen in the event data) based on their string distances from each other, send a request to each domain in the set of domains, and check the similarity between the returned webpages (e.g., based on style). The similarity matching may be the same as or different than the similarity matching in technique (2) above. For example, the application may identify JonBakery.com, JonBakes.com, and JonBaker.com as a set of domains, representing potential aliases of each other, based on the string distance between the domain names. The webpages at JonBakery.com, JonBakes.com, and JonBaker.com can be retrieved, and the styles of those retrieved webpages can be compared. If the styles are identical or similar, the application can determine that the set of domains [JonBakery.com, JonBakes.com, and JonBaker.com] is a set of aliases, and select one of the domains from the set of domains to act as the master domain. For instance, the application may randomly select JonBaker.com as the master domain, and normalize all future event data to the master domain by modifying any event data associated with alias domains JonBakery.com.com and JonBakes.com to be associated with the master domain JonBaker.com (any event data associated with JonBaker.com will remain associated with JonBaker.com).

The sets of domains, determined to be aliases using techniques (1), (2), and/or (3) above, can be merged into a single set of alias domains. Then, in an embodiment, merged sets of alias domains with unreasonably high numbers of domains in them (e.g., sets comprising a number of domains exceeding a predetermined threshold value) are filtered out from the collected event data. Specifically, event data associated with any domains in any filtered-out sets of domains can be excluded from the event pool. This is because large sets of alias domains are indicative of redirection by domain sellers, hosting services, social media platforms, and/or the like, rather than association with a valid account.

In addition, event data may be filtered out based on one or more other criteria. For example, event data associated with an IP address within ranges of IP addresses associated with web service providers (e.g., Amazon™, Google™, Microsoft™, etc.) may be excluded from the event pool. As another example, event data, associated with an entity from which bot-like activity patterns have been detected, may be excluded from the event pool. Bot-like activity patterns may comprise an unreasonably high number of requests, web-scraping behavior, periodic events, and/or the like.

2.2. Aggregation into Mappings

In step 320, the application aggregates events, stored in the event pool, into a mapping pool. For ease of understanding, this step will be described using a concrete, non-limiting example. Assume that the event pool comprises the entries represented in Table 1 below. Notably, not all fields of the entries are necessarily shown in the included tables, and the entries in these tables only represent a tiny fraction of the entries that would exist in an actual pool and for only a single entity. The entries of an actual implementation may comprise more, fewer, or different fields and/or different representations of field values than those shown in the tables.

TABLE 1

| Date | IP Address | Domain | Geo-IP | Source |
|---|---|---|---|---|
| Dec. 30, 2016 | 1.1.1.1 | xyz.com | United States | Source1 |
| Jan. 01, 2017 | 1.1.1.1 | abc.com | United States | Source2 |
| Jan. 03, 2017 | 1.1.1.1 | abc.com | United States | Source3 |
| Jan. 04, 2017 | 1.1.1.1 | abc.com | United States | Source3 |
| Jan. 06, 2017 | 1.1.1.1 | abc.com | United States | Source3 |
| Jan. 14, 2017 | 1.1.1.1 | abc.com | United States | Source3 |
| Jan. 15, 2017 | 1.1.1.1 | abc.com | United States | Source3 |
| Jan. 20, 2017 | 1.1.1.1 | xyz.com | United States | Source1 |
| Jan. 28, 2017 | 1.1.1.1 | abc.com | United States | Source3 |
| Jan. 28, 2017 | 1.1.1.1 | abc.com | United States | Source3 |
| Jan. 29, 2017 | 1.1.1.1 | abc.com | United States | Source2 |
| Jan. 02, 2017 | 1.1.1.1 | abc.com | United States | Source3 |

In this example, two events, associating the IP address 1.1.1.1 with a domain of xyz.com, have been received from Source1 (e.g., a data vendor), two events, associating the same IP address with a domain of abc.com, have been received from Source2 (e.g., directly from a website, for example, reporting a login), and eight events, associating the same IP address with abc.com, have been received from Source3 (e.g., a marketing automation platform). On Feb. 3, 2017, these twelve events from the event pool may be condensed into two entries in the mapping pool, as shown in Table 2 below.

TABLE 2

| IP Address | Company | Span | Delay | Spread | Strength | Overlap | Sources |
|---|---|---|---|---|---|---|---|
| 1.1.1.1 | XYZ | 21 | 14 | 2 | 2 | 1 | Source1 |
| 1.1.1.1 | ABC | 32 | 1 | 9 | 10 | 2 | Source2, Source3 |

As illustrated in Table 2, all individual events, stored in the event pool, are matched to other events with a matching entity, and aggregated into a single entry in the mapping pool that associates the IP address with an account name. In an embodiment, the account name may be derived from the domain name (e.g., "XYZ" from "xyz.com" and "ABC" from "abc.com"). Statistics (e.g., span value, delay value, spread value, strength value, and overlap value) are calculated for each set of aggregated events and included in the entry in the mapping pool. In this case, two entries with the IP address 1.1.1.1 and the same domain name "xyz.com" have been combined into a single entry with a span value of twenty-one days, a delay value of fourteen days, a spread value of two days, a strength value of two days, an overlap value of one source, and a list comprising an identifier of that one source. Similarly, ten entries with the same IP address, but a different domain name "abc.com" have been combined into a single entry with a span value of thirty-two days, a delay value of one day, a spread value of nine days, a strength value of ten days, an overlap of two sources, and a list comprising an identifier for each of those two sources. In addition, the domain name "xyz.com" has been associated with XYZ company with a normalized company name of "XYZ", and the domain name "abc.com" has been associated with ABC company with a normalized company name of "ABC".

2.3. Confidence Calculation for Each Mapping

In step 330, the application calculates confidence values for each mapping in the mapping pool. In an embodiment, an overall confidence value for each mapping is calculated based on a plurality of different confidences. For example, the confidence value may be a combination of a time confidence, a statistical confidence, and/or a source confidence, which are each calculated based on the aggregated information within each mapping.

2.3.1. Time Confidence

The time confidence for a particular mapping may be calculated using Equation 1 below:

$$\frac{\log_3(\text{span}) - \log_3(\text{delay})}{1 + |\log_3(\text{span}) - \log_3(\text{delay})|} \quad \text{[Equation 1]}$$

wherein span is the span value associated with the mapping, and delay is the delay value associated with the mapping.

Equation 1 produces a sigmoid curve, based on the reasoning that mappings with higher span values should decay at a lower rate than mappings with lower span values. However, at the same time, mappings with low span values should still be captured. For example, if a particular mapping was active yesterday and only yesterday, it will have a high time confidence value (e.g., 0.3), since it is new, but that time confidence value will fall off rapidly if it is not active again in the future. Conversely, a competing mapping that has not been active for the past month, but which was active over an entire year prior to the past month will have an even higher time confidence value (e.g., 0.8), such that it will exceed the new, yet fleeting, mapping in terms of their respective confidence values.

2.3.2. Statistical Confidence

The statistical confidence may be calculated using Equation 2 below:

$$weight_{strength}*log_{1000}(strength)+weight_{spread}*log_{100}(spread) \quad \text{[Equation 2]}$$

wherein strength is the strength value associated with the mapping, wherein spread is the spread value associated with the mapping, wherein $weight_{strength}+weight_{spread}=1.0$, and wherein, in an embodiment, $weight_{strength}=weight_{spread}=0.5$.

Equation 2 uses logarithmic functions to reward statistics such as strength and spread. In practice, the majority of mappings may have low values for these statistics. Thus, those mappings with higher values for these statistics are distinguished and "rewarded" in terms of their respective confidence values.

2.3.3. Source Confidence

The source confidence for a particular mapping may be calculated using Equation 3 below, which essentially subtracts the probability of each source, which supplied the event(s) from which the mapping was derived, being wrong:

$$1-{}_1^S\Pi(1-source\_confidence_s) \quad \text{[Equation 3]}$$

wherein S is the overlap value for the mapping, and the source_confidence is a confidence value, between zero and one, that is associated with each source (e.g., a global confidence value for each source based on the past reliability or accuracy of the source) from which events, used to derive the mapping, were received.

The source confidence can be an important variable in the overall confidence value. While some sources may supply trustworthy data based on a reliable methodology, other sources may be incredibly noisy (e.g., lots of inaccurate data mixed in with accurate data). In an embodiment, the source_confidence value for a particular source may be determined based on the assumption that, if N separate sources agree on a mapping, then the mapping is true. N should be at least two, and preferably, more than three.

Figure 4A:
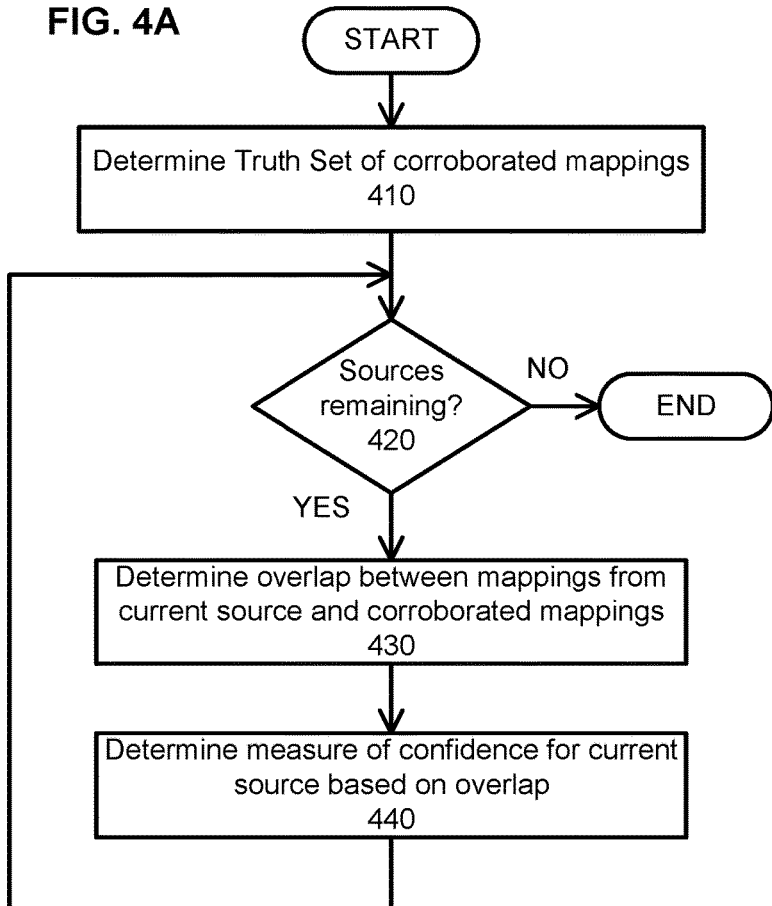
FIGS. 4A and 4B illustrate a process for determining a source confidence value for a plurality of sources.
Figure 4B:
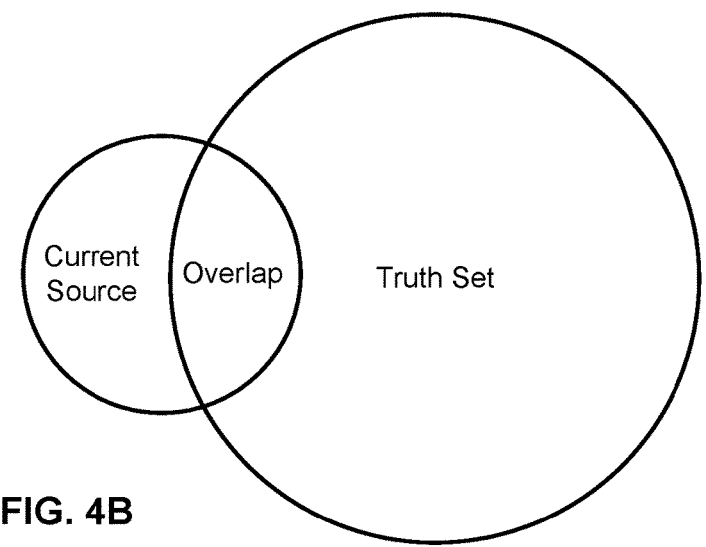

FIGS. 4A and 4B illustrate an example process 400 for determining a source confidence value for each source of events, according to an embodiment. While process 400 is illustrated with a certain arrangement and ordering of steps, process 400 may be implemented with fewer, more, or different steps and a different arrangement and/or ordering of steps.

In step 410, to evaluate the accuracy of a particular source, the application may construct a set of "true" mappings by creating a pool of mappings from the mapping pool that are based on at least N (e.g., three) sources. In an embodiment, the source to be evaluated may be excluded from this pool. In such an embodiment, step 410 may occur after decision block 420, such that a new pool of "true" mappings is created each time a source is evaluated. In either case, these selected mappings represent a "truth set," i.e., a subset of mappings which are assumed to be true.

In step 420, the application determines whether any sources remain to be considered. It should be understood that all sources, from which events are obtained, may be evaluated according to process 400. If at least one source remains to be considered (i.e., "YES" in step 420), the next source is selected as the current source, and process 400 proceeds to step 430. Otherwise, if no sources remain to be considered (i.e., "NO" in step 420), process 400 ends.

In step 430, the overlap or intersection is determined between the mappings, derived from the current source being evaluated, and the truth set of mappings. This intersection of mappings is illustrated in FIG. 4B, according to an embodiment.

In step 440, the application uses this intersection to determine a measure of confidence for the current source being evaluated, based on how many true mappings and/or how many untrue mappings have been derived from the current source being evaluated. In other words, a mapping, derived from the current source, that matches a mapping in the truth set (e.g., mapping in both entity and account) is assumed to be a true mapping derived from the current source. The determined measure can then be used as, or to derive, a source confidence (i.e., value of source_confidence in Equation 3) for the current source being evaluated. For example, the source confidence may be a ratio (e.g., percentage) of the number of "true" mappings in the overlap to the total number of mappings derived from the current source. After the source confidence has been determined for the current source, process 400 returns to step 420 to evaluate the next source, if any, or else end.

2.3.4. Overall Confidence

The overall confidence for a particular mapping may be calculated, based on each of the time confidence, statistical confidence, and source confidence for that mapping, using Equation 4 below:

$$weight_1(conf_{source}+(1-conf_{source})conf_{stat})+weight_2(conf_{time}) \quad \text{[Equation 4]}$$

wherein $conf_{time}$ is the calculated time confidence, $conf_{stat}$ is the calculated statistical confidence, and $conf_{source}$ is the calculated source confidence, wherein $weight_1+weight_2=1.0$, and wherein, in an embodiment, $weight_1=0.7$ and $weight_2=0.3$.

2.4. Filtering and Cleaning the Mappings

In step 340, the mappings, with their calculated confidence values, may be filtered and cleaned or corrected. In an embodiment, step 340 comprises ISP filtering and/or location cleaning.

2.4.1. ISP Filtering

Normally, if an entity includes an IP address that belongs to an ISP (e.g., which dynamically assigns IP addresses to different customers), there may be many contradicting mappings for that same entity. Thus, in an embodiment, the application filters mappings by calculating the ratio of the confidence value for the mapping with the maximum confidence value for a particular entity to the sum of all confidence values for all mappings for that particular entity, and then comparing this ratio to a threshold. For example, this comparison may be represented as Equation 5 below:

$$\frac{\max(confidence_{entity})}{\text{sum}(confidence_{entity})} > 0.5(1 - \max(confidence_{entity}))$$ [Equation 5]

Thus, for example, if the maximum confidence value is 0.5, then that confidence value would need to represent 25% of the cumulative confidence values in order to be considered a valid mapping. If the maximum confidence value were 0.1, it would need to represent 45% of the cumulative confidence values. This thresholding filters out conflicting mappings in cases in which no single mapping clearly stands out in terms of its confidence value.

In an embodiment, sum(confidence$_{entity}$) may represent a sum of all distinct confidence values, rather than all confidence values, to avoid over-counting. Specifically, two or more mappings for the same entity may end up having the same confidence values. In this case, dividing by the sum of all distinct confidence values, rather than the sum of all confidence values (i.e., including distinct confidence values and identical confidence values), can make the ISP filter more conservative. Alternatively, sum(confidence$_{entity}$) may represent the sum of all confidence values, regardless of distinctness.

In an embodiment, if Equation 5 is not satisfied, all of the mappings associated with that particular entity may be filtered (e.g., discarded or ignored). Otherwise, if Equation 5 is satisfied, the mapping having the maximum confidence value for the entity may be kept, while all of the other mappings associated with the entity may be filtered. Essentially, Equation 5 ensures that mappings with lower confidences need a greater percentage of the total confidence value in order to avoid being discarded, whereas mappings with higher confidences will remain unless they are competing against an unreasonable number of mappings for the same entity.

2.4.2. Location Cleaning

Since ranges of IP addresses are associated with certain countries, if an entity includes an IP address, this IP address can be used to determine the associated country or other geographical information. The application may use this geographical information to correct or clean mappings. For instance, an event may associate an online activity (e.g., website visit) to a contact for an account (e.g., based on a login to the website). In this case, if the contact is incorrect, the mapping will be incorrect. In addition, if the contact is employed by a firm with different branches (e.g., a multi-national company, a consulting firm, etc.), the contact may be performing activity related to one branch, while linking that activity to another branch (e.g., the branch at which the contact is employed).

In an embodiment, the application addresses these issues by determining what portion of events for a particular account, from a particular source, are coming from a different country. Specifically, the application may collect statistics on the account level, instead of by IP address, in order to determine whether or not the account has been correctly linked. As an example, if thousands of IP addresses have been previously mapped to an account for "ABC, U.S.A." in the United States, it may be presumed that the majority of new IP addresses, received in new events, should also originate in the United States.

In an embodiment, the application can correct, clean, or filter mappings as follows:

(1) If the IP addresses in the majority of new events are associated with a different country than the country in an existing mapping, change the country in the existing mapping to the new, different country;

(2) If the account in a mapping represents a large company with multi-national offices and the IP addresses in events are associated with a plurality of different countries, with no single country have a clear majority, split the mapping into a plurality of mappings, with one mapping for each of the plurality of countries or for each of the main countries (e.g., and discard mappings for countries with a relatively trivial number of events); and/or (3) If the IP addresses in new events are associated with a different country than the country in an existing mapping, but the source and/or mapping confidence value is low, do not change the existing mapping and do not create a new mapping for the new events (i.e., discard, ignore, or otherwise filter the new events).

2.4.3. Valid Domain Checking

In an embodiment, one of the key fields used to identify an account is the domain. Due to the noise in the event data, some mappings may map an invalid and/or faulty domain to an account. Thus, in an embodiment, the application may validate one or more domains in the mappings by sending a request to each domain. For example, the application may validate the domain name in each mapping associated with a low confidence value (e.g., a confidence value below a predetermined threshold value) by sending a request to each domain name in the low-confidence mappings. If the request to a domain associated with a particular mapping is redirected to a site that is not indicative of a valid account (e.g., a domain seller, hosting service, social media platform, etc.) and/or the request results in an error or some other reason to believe that the mapping is likely faulty, the mapping may be discarded or excluded as invalid.

2.5. Selection of Mapping

In step 350, for each entity, the application selects, from the mappings that were filtered and cleaned in step 340, the remaining mapping with the highest confidence value determined in step 330. In an embodiment, the application may select a mapping only if its confidence value exceeds a minimum threshold. For example, in some cases, the application may discard all of the mappings for a particular entity, including the mapping with the highest confidence value, if none of the mappings have a confidence value above a certain minimum threshold value.

In an embodiment, the minimum threshold may depend on the particular context in which the mappings are to be used. For example, some contexts or users of platform 110 may require a higher level of confidence for the mappings, in which case the minimum threshold can be set higher. Other contexts or users may not require such a high level of confidence, in which case the minimum threshold can be set lower or eliminated altogether.

In an embodiment, the output of process 300 is a graph, list, table, or other representation of each remaining mapping between entities and accounts. It should be understood that this representation will only include the mappings that remain after the filtering and cleaning in step 340 and the selection and/or thresholding in step 350. The representation may be stored and/or transmitted as a data structure, displayed in a graphical user interface, used as an input into another application (e.g., via an API), and/or the like. In an embodiment, the representation is a database of the final mappings that is indexed by entity. The entity index may be a primary, unique index, such that a single entity never maps to more than one account.

Furthermore, in an embodiment, each of the final mappings may be linked, by the account represented in the mapping, to contact information for the account. For example, the account identifier in the mapping may be used (e.g., as an index to a database) to retrieve contact information associated with that account identifier.

Thus, for example, a user may witness online activity, at the user's website, from a particular IP address. The user may initiate a query of the final mappings, through the application, using the IP address as search criteria, and the application may responsively return an account name (e.g., company name) and the associated contact information for that account to the user. Advantageously, this enables the user to contact an Internet visitor, who would otherwise have been uncontactable due to the inherent anonymity of the Internet.

This lookup process could also be automated. For example, a website operator could develop third-party software that utilizes an API of the application to automatically query the final mappings for each IP address seen in online activity at the website (e.g., in real time, periodically, etc.). The application may then automatically return the account names and/or contact information associated with those IP addresses for further processing by the third-party software and/or use by the website operator.

2.6. Example Implementation

Figure 5:
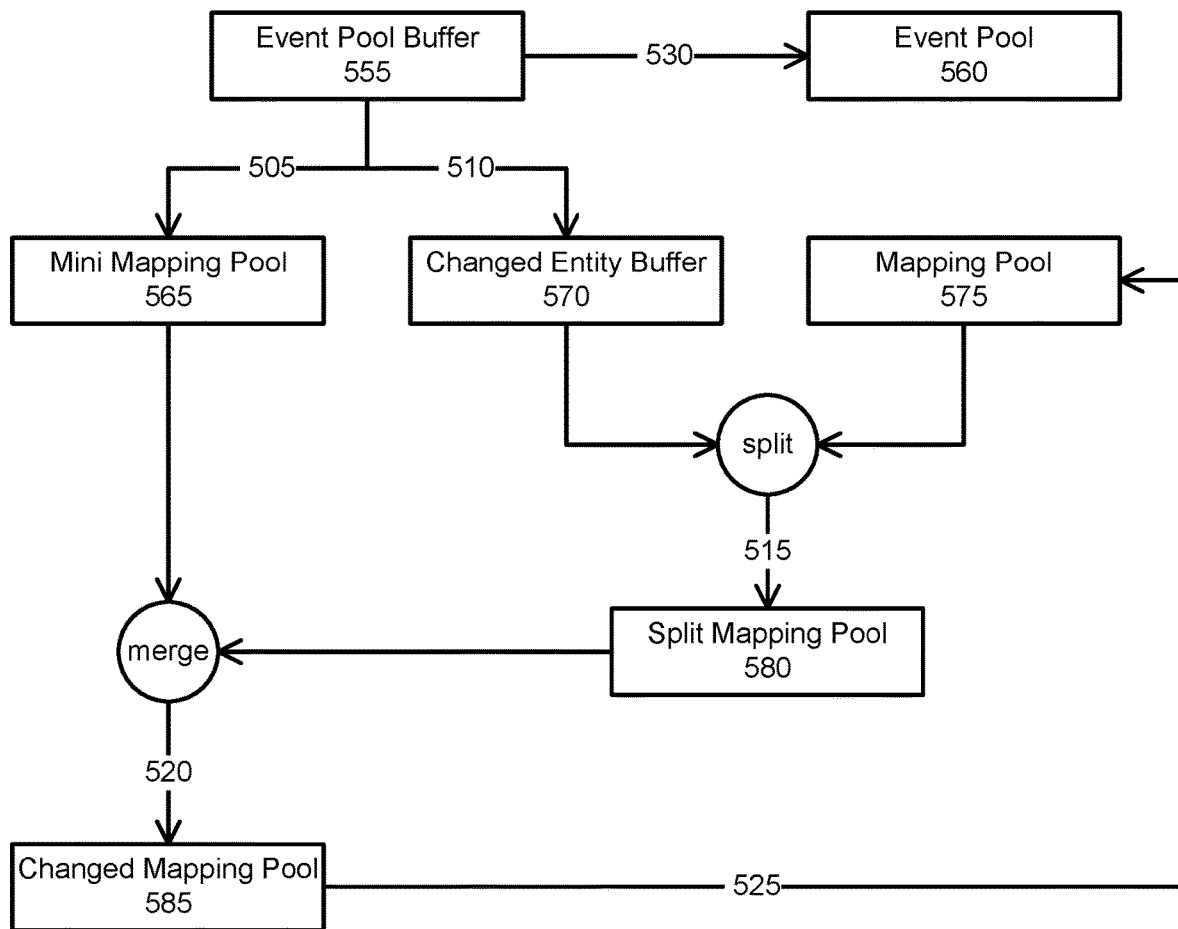
FIG. 5 illustrates the interactions between various data structures in one example implementation of the process illustrated in FIG. 3, according to an embodiment.

FIG. 5 illustrates the interactions between various data structures in one example implementation of process 300, according to an embodiment. It should be understood that this process may be implemented by the disclosed application (e.g., server application 112 and/or client application 132). While the process is illustrated with certain data structures and steps, the process may be implemented with fewer, more, or different data structures and/or different steps.

Events collected in step 310 are initially stored in event pool buffer 555, prior to being stored in event pool 560. As events are added to event pool buffer 555, they may each be given a status that indicates they are new. In addition, the events may be normalized as discussed elsewhere herein.

In step 505, the events in event pool buffer 555 are aggregated into mappings, as described elsewhere herein. These mappings are initially stored in mini mapping pool 565, to facilitate a smoother merge in step 520. In addition, in step 510, the unique entities from the events in event pool buffer 555 are stored in changed entity buffer 570. Changed entity buffer 570 may be partitioned by the date of the events. As the events in event pool buffer are aggregated into mappings, their statuses may be changed to indicate that they are being aggregated and/or the time that they have been aggregated (e.g., to prevent redundant processing).

In step 515, the mappings stored in existing mapping pool 575 are split on the entities stored in changed entity buffer 570 to produce a split mapping pool 580. This may involve sorting mapping pool 575 based on the entities in the mappings, or extracting the mappings for only those entities stored in changed entity buffer 570.

In step 520, mini mapping pool 565 is merged with split mapping pool 580 to produce changed mapping pool 585. This merge may comprise, for each mapping that is present in both mini mapping pool 565 and split mapping pool 580, calculating the combined statistic values and new confidence value, as described elsewhere herein, and adding a new entry for the mapping, with the combined statistic values and confidence value, to changed mapping pool 585. To facilitate the calculations of the statistic and confidence values, the pools may be split on both account (e.g., company name) and domain. Mappings that are only present in mini mapping pool 565 may simply be added to changed mapping pool 585 with their respective statistic and confidence values.

In step 525, mapping pool 575 is updated with the entries in changed mapping pool 585. For example, the entries in changed mapping pool 585 may overwrite any corresponding entries in mapping pool 575. In addition, in step 530, the events in event pool buffer 555, that were aggregated in step 505 (e.g., those whose statuses indicate that they were being aggregated), are emptied into event pool 560.

It should be understood that this implementation of process 300 may be performed periodically as new events are added to event pool buffer 555 (e.g., at specific time intervals, when event pool buffer 555 reaches a predetermined size, etc.). In addition, in an embodiment, all changes to mapping pool 575 and/or event pool 560 may be logged (e.g., by date and data) for auditing purposes and/or for restoring or rolling back mapping pool 575 and/or event pool 560 to a prior state if necessary.

2.7. Example Web Service

Figure 6:
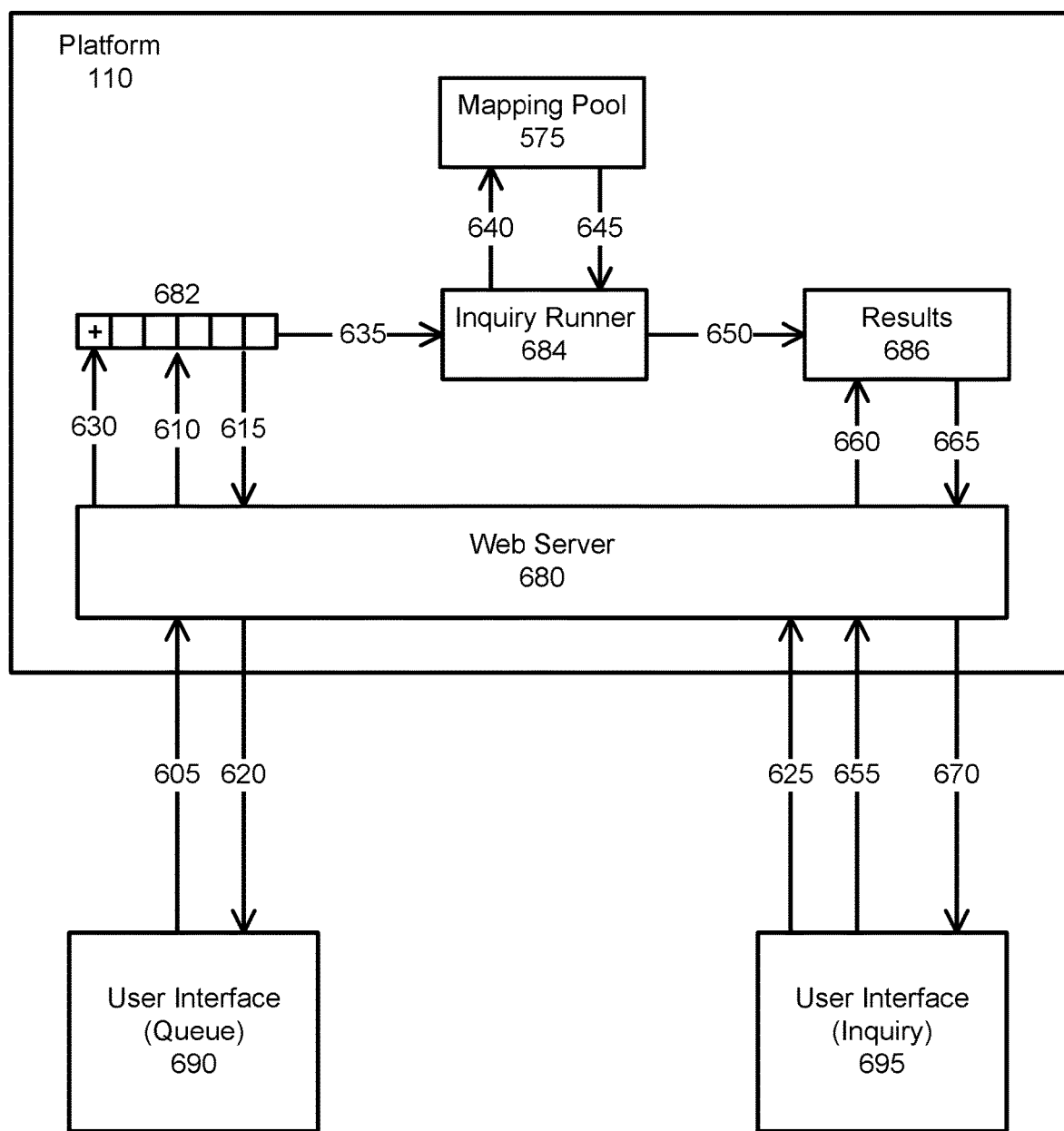
FIG. 6 illustrates the interactions between various data structures in one example implementation of a web service, according to an embodiment.

As discussed elsewhere herein, platform 110 may implement a web service, for example, as part of server application 112. FIG. 6 illustrates the interactions between various data structures in one example implementation of a web service, according to an embodiment. While the process is illustrated with certain data structures and steps, the process may be implemented with fewer, more, or different data structures and/or different steps.

As illustrated, platform 110 may comprise a web server 680, which serves a graphical user interface, comprising a user interface 690 for interacting with a queue of inquiries 682, and a user interface 695 for submitting inquiries. Users may have access to one or both of user interfaces 690 and 695, based on their permissions. For example, an administrative user may have access to user interface 690 for managing the queue of inquiries submitted by clients, and a plurality of client users may have access to user interface 695 for submitting inquiries.

In step 605, a user of user interface 690 may submit a request for information regarding queue 682 (e.g., to view all inquiries in queue 682). The request is sent to web server 680 (e.g., via network(s) 120), and, in response, web server 680 queries queue 686 in step 610. In response to the query, a representation of queue 682 is returned to web server 680 in step 615. Web server 680 then parses the representation of queue 682 to generate a renderable representation of queue 682, and returns the renderable representation of queue 682 to user interface 690 for visual presentation to the user (e.g., on a display of the user's user system 130).

In step 625, a user of user interface 695 may submit an inquiry. The inquiry may comprise an entity, account name, and/or any other indexable field of the mappings in mapping pool 575. For example, a user who has noticed increased activity from a particular IP address may wish to tie that otherwise anonymous IP address to a specific company, so that the user can then reach out and contact that company directly (e.g., for marketing or sales purposes). Accordingly, the user may submit an inquiry, via user interface 695, for a company name that has been mapped to the otherwise anonymous IP address. The inquiry is sent to web server 680 (e.g., via network(s) 120). Web server 680 may validate the inquiry (e.g., to ensure it satisfies formatting requirements, informational requirements, etc.), and check whether or not the inquiry already exists in queue 682. If the inquiry cannot be validated, web server 680 may return an error message to user interface 695. Otherwise, if the inquiry is validated and is not already present in queue 682, web server 680 adds the inquiry to queue 682 in step 630. If the inquiry is already present in queue 682, web server 680 may discard the inquiry. Alternatively, web server 680 could add all validated inquiries to queue 682, regardless of whether or not they are redundant. It should be understood that, when web server 680 adds an inquiry to queue 682, it may parse the inquiry from user interface 695, and construct an inquiry in a new format to be added to queue 682.

In step 636, an inquiry from the front of queue 682 is provided to inquiry runner 684. Inquiry runner 684 may comprise a software module that converts the inquiry into a query to mapping pool 575. Thus, in step 640, inquiry runner 684 queries mapping pool 575, and receives the result of the query in step 645. In step 650, inquiry runner 684 stores the result of the query in results 686, which may comprise a local cache of platform 110. Results of queries may be stored in results 686 in JSON or any other suitable format.

In step 655, a user of user interface 695 may submit a request for the results of a previous inquiry (e.g., submitted in step 625). The request is sent to web server 680 (e.g., via network(s) 120), and, in response, web server 680 queries results 686 in step 660. In response to the query, the results of the inquiry (if any) are returned to web server 680 in step 665. Web server 680 then parses the results to generate a renderable representation of the results, and returns the renderable representation of the results to user interface 695 for visual presentation to the user (e.g., on a display of the user's user system 130). Web server 680 may construct the renderable representation of results using stored templates for reporting.

In an alternative or additional embodiment, an API may exist for usage in a similar manner as user interface 695. For example, an application may submit inquiries via the API (e.g., similar to step 625) and receive results to those inquiries in response (e.g., similar to step 670). In this manner, third-party software (e.g., executed by an external system 140) may be used to automate the inquiry process for various users of platform 110.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method for de-anonymizing anonymous online activities, the method comprising using at least one hardware processor to:
   receive a plurality of events from a plurality of sources, wherein each of the plurality of events represents an online activity and indicates an entity;
   aggregate subsets of the plurality of events into a plurality of mappings, wherein each of the plurality of mappings associates the entity, shared by a subset of the plurality of events, with an account;
   for each of the plurality of mappings, compute a confidence value for the mapping based on one or more statistics;
   select a final subset of the plurality of mappings based on the confidence values for the plurality of mappings; and
   respond to one or more requests that indicate a requested entity by
      searching the final subset of mappings for the requested entity, and
      returning an indication of an account that is associated, in the final subset of mappings, with the requested entity.

2. The method of claim 1, wherein each entity comprises one or more of an Internet Protocol (IP) address, a domain name, or a cookie.

3. The method of claim 1, further comprising, for each of the plurality of events, determining a geographical region associated with an Internet Protocol (IP) address of the event.

4. The method of claim 1, wherein each account is associated with contact information for a company.

5. The method of claim 1, wherein selecting a final subset of the plurality of mappings based on the confidence values for the plurality of mappings comprises, for at least one set of two or more mappings which each associate a same entity with different accounts:
   determining one of the two or more mappings with a maximum confidence value among the two or more mappings;
   computing a sum of the confidence values for the two or more mappings;
   computing a ratio of the maximum confidence value to the sum of the confidence values; and,
   when the ratio does not exceed a threshold, excluding the two or more mappings from the final subset of mappings.

6. The method of claim 5, wherein selecting a final subset of the plurality of mappings based on the confidence values for the plurality of mappings further comprises, for the at least one set of two or more mappings, when the ratio exceeds the threshold, including the one mapping with the maximum confidence value in the final subset of mappings.

7. The method of claim 1, wherein computing a confidence value for each mapping based on the one or more statistics comprises:
  calculating a time confidence value, indicating a timing of events from which the mapping was derived;
  calculating a statistical confidence value, indicating a frequency of the events from which the mapping was derived;
  calculating a source confidence value, indicating an accuracy of one or more of the plurality of sources from which the events, from which the mapping was derived, were received; and
  calculating the confidence value based on the time confidence value, the statistical confidence value, and the source confidence value.

8. The method of claim 1, further comprising using the at least one hardware processor to, after a new set of events is received from one or more sources:
  aggregate subsets of the new set of events into a new set of mappings;
  extract a portion of the final subset of mappings that include entities in the new set of events;
  merge the new set of mappings with the extracted portion of the final subset of mappings by, for each mapping in the merged set of mappings, recomputing the confidence value for the mapping; and
  update the final subset of mappings with the merged set of mappings.

9. The method of claim 8, wherein each of the plurality of events is stored in a persistent event pool, and wherein the new set of events is not stored in the persistent event pool until after the final subset of mappings has been updated.

10. The method of claim 1, further comprising using the at least one hardware processor to:
  generate a graphical user interface comprising one or more inputs for receiving a user request comprising a requested entity;
  in response to receiving the user request, add an inquiry, representing the request, to a queue of inquiries;
  subsequently, when the inquiry reaches a front of the queue, query the final subset of the plurality of mappings based on the inquiry; and,
  after receiving a result of the query, generate a graphical user interface comprising a visual representation of the result of the query.

11. The method of claim 1, further comprising using the at least one hardware processor to normalize the plurality of events.

12. The method of claim 11, wherein normalizing the plurality of events comprises, for each of one or more master domains:
  detecting aliases of the master domain; and
  converting all detected aliases of the master domain to a single identifier of the master domain.

13. The method of claim 12, wherein detecting aliases of the master domain comprises:
  sending a request to a first domain;
  determining whether the request is redirected to the master domain; and,
  when determining that the request is redirected to the master domain, determining that the first domain is an alias of the master domain.

14. The method of claim 12, wherein detecting aliases of the master domain comprises:
  constructing a set of domains associated with a same Internet Protocol (IP) address;
  sending a request to each domain in the constructed set of domains;
  determining a similarity between webpages returned in response to the requests; and,
  determining that a subset of the set of domains, for which the returned webpages are determined to be similar, are aliases of each other.

15. The method of claim 12, wherein detecting aliases of the master domain comprises:
  constructing a set of domains that are within a string distance from each other;
  sending a request to each domain in the constructed set of domains;
  determining a similarity between webpages returned in response to the requests; and
  determining that a subset of the set of domains, for which the returned webpages are determined to be similar, are aliases of each other.

16. The method of claim 1, further comprising using the at least one hardware processor to, before aggregating the subsets of the plurality of events into the plurality of mappings, filter out events based on Internet Protocol (IP) address.

17. The method of claim 1, further comprising using the at least one hardware processor to, before aggregating the subsets of the plurality of events into the plurality of mappings, filter out events for which the indicated entity exhibits an activity pattern indicative of a bot.

18. The method of claim 1, wherein the one or more statistics comprise one or more of:
  a span value representing a time period over which the mapping was active;
  a delay value representing a time period since the mapping was last active;
  a spread value representing a time period indicating a frequency with which the mapping was active over the span value;
  a strength value representing a frequency with which the mapping was active over the span value;
  a source weight representing a relative accuracy of one of the plurality of sources from which the event in the mapping was received; or
  an overlap value representing a number of the plurality of sources that corroborate the mapping.

19. A system for de-anonymizing anonymous Internet Protocol (IP) addresses, the system comprising:
  at least one hardware processor; and
  one or more software modules configured to, when executed by the at least one hardware processor,
    receive a plurality of events from a plurality of sources, wherein each of the plurality of events represents an online activity and indicates an entity,
    aggregate subsets of the plurality of events into a plurality of mappings, wherein each of the plurality of mappings associates the entity, shared by a subset of the plurality of events, with an account,
    for each of the plurality of mappings, compute a confidence value for the mapping based on one or more statistics,
    select a final subset of the plurality of mappings based on the confidence values for the plurality of mappings, and
    respond to one or more requests that indicate a requested entity by
      searching the final subset of mappings for the requested entity, and returning an indication of an account that is associated, in the final subset of mappings, with the requested entity.

20. A non-transitory computer-readable medium having instructions stored therein, wherein the instructions, when executed by a processor, cause the processor to:
- receive a plurality of events from a plurality of sources, wherein each of the plurality of events represents an online activity and indicates an entity;
- aggregate subsets of the plurality of events into a plurality of mappings, wherein each of the plurality of mappings associates the entity, shared by a subset of the plurality of events, with an account;
- for each of the plurality of mappings, compute a confidence value for the mapping based on one or more statistics;
- select a final subset of the plurality of mappings based on the confidence values for the plurality of mappings; and
- respond to one or more requests that indicate a requested entity by
  - searching the final subset of mappings for the requested entity, and
  - returning an indication of an account that is associated, in the final subset of mappings, with the requested entity.

* * * * *